United States Patent [19]
Reiley et al.

[11] 3,990,330
[45] Nov. 9, 1976

[54] METHOD OF PRODUCING SEAMLESS TUBE MILL PIERCER MANDREL

[75] Inventors: Bertrand M. Reiley, Canfield; Edwin J. Muccillo, Youngstown; Robert G. Griffith, Poland, all of Ohio

[73] Assignee: Youngstown Sheet and Tube Company, Youngstown, Ohio

[22] Filed: May 8, 1975

[21] Appl. No.: 575,697

Related U.S. Application Data

[62] Division of Ser. No. 352,928, April 20, 1973, Pat. No. 3,882,595.

[52] U.S. Cl. ............................. 76/107 R; 29/516; 138/140; 228/127; 228/175
[51] Int. Cl.² .................... B21K 5/20; B21D 39/04; B23K 13/00
[58] Field of Search ............. 29/516; 228/131, 158, 228/173, 127, 175; 72/97; 76/107 R; 138/140

[56] References Cited

UNITED STATES PATENTS

| | | | |
|---|---|---|---|
| 831,887 | 9/1906 | Nicholson | 228/131 |
| 1,839,964 | 1/1932 | Harvey | 29/516 UX |
| 2,177,435 | 10/1939 | Kretz | 228/131 |
| 3,149,513 | 9/1964 | Dallens | 29/516 |
| 3,372,462 | 3/1968 | Reid et al. | 29/516 X |
| 3,863,328 | 2/1975 | Arntz | 29/516 |

FOREIGN PATENTS OR APPLICATIONS

| | | | |
|---|---|---|---|
| 822,983 | 10/1937 | France | 138/140 |

*Primary Examiner*—Charlie T. Moon
*Attorney, Agent, or Firm*—John Stelmah

[57] ABSTRACT

A laminate tube structure produced by stretch reducing, in combination, a pair of tubes. The resultant tube structure is particularly adapted for use as a mandrel for supporting a piercing point of a seamless-tube mill.

5 Claims, 5 Drawing Figures

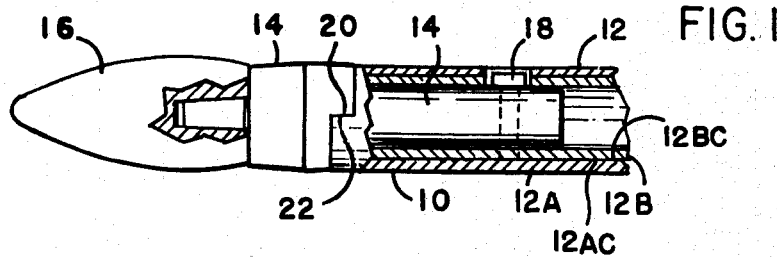
FIG. 1
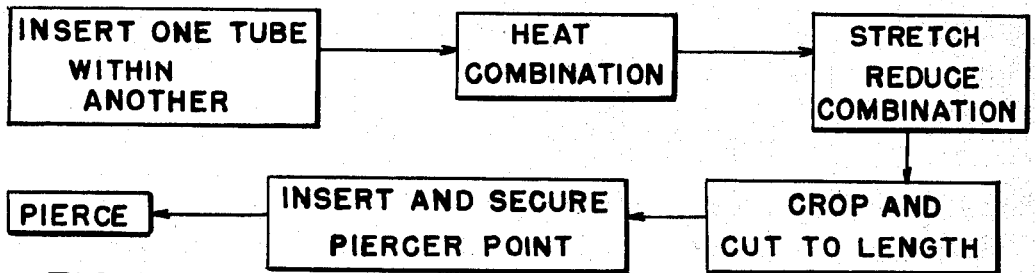
FIG. 2
FIG. 3
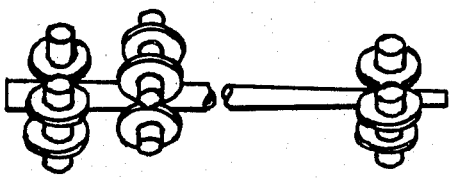
FIG. 4
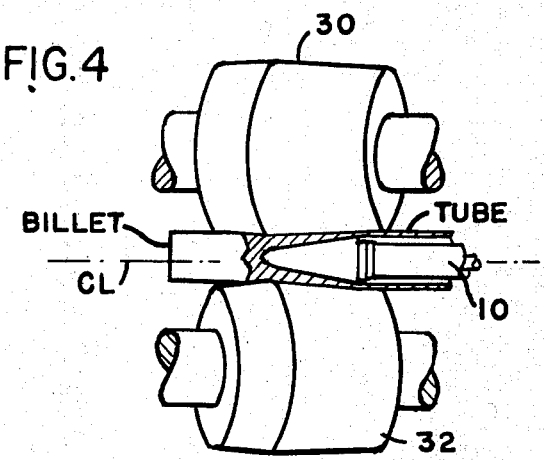
FIG. 5
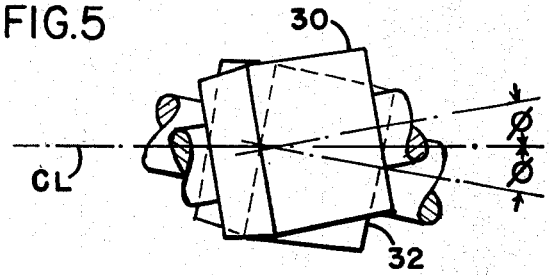

3,990,330

METHOD OF PRODUCING SEAMLESS TUBE MILL PIERCER MANDREL

BACKGROUND OF THE INVENTION

This is a divisional application of copending application Ser. No. 352,928, filed Apr. 20, 1973, now U.S. Pat. No. 3,882,595.

This invention relates to a laminate tube structure and method of producing the same in a manner whereby a monocoque-type structure results.

This invention further relates to a method of producing a mandrel which can withstand increased compressive stresses and hence makes it particularly adaptable for supporting a piercing plug of a seamless-tube mill.

This invention also relates to a method of increasing the production rate in a seamless steel mill.

The situation from which the invention was developed was the search for a mandrel structure which can withstand the high compressive forces imposed on the piercer mandrel of a seamless-tube mill.

DESCRIPTION OF THE PRIOR ART

Seamless-tube mills usually include a relatively long mandrel which supports and carries the piercer point. A pair of opposing rolls which rotate in the same direction, are positioned at specific angles to the pass centerline. The rolls being set at an angle to the pass line impart two components of force to the billet round as it is forced through the mill. One component imparts a spinning motion to the round while the other component imparts a longitudinal forward motion along the pass line. As the round is fed forward, it contacts the piercer point and the metal of the round flows over and about the point to form the seamless tube. The mandrel is not forced through the round, the metal flows over and about the point and then about the mandrel. As the metal flows over the piercer point, great compressive stresses are imposed on the piercer point and consequently on the supporting mandrel.

The opposing rolls are positioned with each respective axis being inclined generally about 6° to 12° with the pass line of the seamless mill. The larger angles are employed in conjunction with the production of relatively large diameter tubes, i.e., those with outside diameters greater than 7 inches. In conjunction with some of what may be termed intermediate size seamless tubes, e.g., 6–7 inches O.D. tubes, it has been the practice to limit the roll angle of inclination to 8°. In such cases, the practical limit of the outside diameter of the mandrel is about 4½ inches. It was found that if the 8 degree angle of inclination was exceeded, a 4½ inch mandrel would not withstand the additional stresses and early mandrel failure occurred.

OBJECTS AND SUMMARY OF THE INVENTION

It is the principal object of this invention to provide a method of producing a laminated tube structure capable of withstanding increased compressive stresses.

It is another object of this invention to provide a mandrel of increased strength, which mandrel is adapted to support a piercing plug in a seamless-tube mill.

It is a further object of this invention to provide a method and means for increasing the production of a seamless-tube mill.

Briefly, the objects are generally attained by stretch reducing, in combination and into mutually engaging relation, a pair of tubes. As a result a monocoque tube structure is provided having increased resistance to compressive forces and to permanent deflection. The inner tube is inserted within the outer tube and the combination is heated in a furnace and then stretch reduced to cause the two tubes to interface. In an exemplary combination, the outer tube has an outside diameter of 5½ inches and a nominal wall thickness of about 0.340 inch, the inner tube has an outside diameter of 4½ inches and a nominal wall thickness of about 0.310 inch. The desired monocoque mandrel outside diameter may be selectively produced by controlling the amount of stretch reduction. Mandrels having outside diameters from 3½ to 4½ inches have been produced from the above-described typical combination. The monocoque tube structure provides an arrangement wherein stress imposed upon one of the tubes is shared by the other. Although it is not necessary, it is preferred that one or both of the tubes comprising the mandrel be of the seamless type.

DESCRIPTION OF THE DRAWING

The invention will be more fully understood and further objects and advantages thereof will become apparent when reference is made to the following detailed description and to the accompanying drawing, in which:

FIG. 1 is a fragmentary cross-sectional view of a laminated tube structure embodying this invention and shown as a mandrel in a mandrel assembly of a seamless-roll mill;

FIG. 2 is a block diagram illustrating the process steps for producing the laminated tube structure of FIG. 1;

FIG. 3 is a schematic representation illustrating the stretch rolling action of a stretch mill;

FIG. 4 is a schematic elevational view of a heated billet round being pierced by the piercing point between piercing rolls; and FIG. 5 is a plan view of the piercing rolls of FIG. 4, illustrating the angles of the rolls in respect to the advancing or pass line of the tube mill.

DESCRIPTION OF A PREFERRED EMBODIMENT

This invention is particularly adapted for producing mandrels for use in conjunction with piercing operations in a seamless-tube mill and will be described in that connection. However, it will be understood that the principles can be applied to other tube structures, such as for example, drill pipe, high strength transmission line pipe.

Referring to FIG. 1 of the drawing, the piercer mandrel assembly 10 comprises a mandrel bar 12, a bar cup 14 and a piercer point 16. The mandrel bar 12 is hollow in order to accommodate passage of a coolant. The mandrel 12 comprises a laminate wall structure formed by joining tubes 12A and 12B into mutually engaging relation. The piercer point 16 is suitably secured to bar cap 14, e.g., by welding. The bar cap 14, in turn, is inserted within the mandrel 12 and suitably fastened to restrict longitudinal movement in respect to the mandrel 12, such as by bolt 18. The cap 14 is also provided with an end flange portion 20 to mate with corresponding flange portion 22 of mandrel 12 and form therewith a dog clutch. The clutch is not necessary for the seamless-tube processing but is preferably used to provide rotation of the mandrel 12 with the piercer point 16, which is caused to rotate by the action of the piercing rolls.

In a representative embodiment of this invention, a first tube, designated as inner tube 12B, is inserted inside a second tube, designated as outer tube 12A. Typically, the inner tube 12B may have an outside diameter of 4½ inches and a nominal wall thickness of about 0.310 inch; also, the outer tube 12 may have an outside diameter of 5½ inches and a nominal wall thickness of about 0.340 inch. The combination of tubes 12A and 12B is heated to hot working temperatures in a furnace having a temperature of about 1950° F. The combination is then stretch reduced in a mill (FIG. 3) to cause the inside circumference 12AC of tube 12A and the outside circumference 12BC of tube 12B to interface, and to form a laminate structure of preselected size. If a laminate structure having an outside diameter of about 4½ inches is selected, the resultant nominal wall thickness will be in the order of 0.600 inches Thus, it will be apparent that the diameters of both the outer tube and the inner tube are reduced. The temperatures of the tubes at the time of rolling in the stretch mill are in the order of about 1750° F for the outer tube 12 and about 1550° F for the inner tube 12B. As is understood in the art, the stretch reducing process comprises the simultaneous reduction of the diameter of and the application of tension to a tube being produced, in the absence of an internal support mandrel. However, so far as we are aware, we are the first to stretch reduce a combination of tubes as described above.

The size is determined by controlling the degree of reduction and stretching on the stretch reducing mill. Laminate structures from the above described typical combination of tubes have been produced, which structures have outside diameters of 4½, 4, 3⅞ and 3¾ inches. However, it will be understood that other combinations of tube sizes and that tubes having steel compositions other than the typical exemplary composition now set forth may be used:

| Typical composition: (indicated percentages, by weight) | |
| --- | --- |
| Carbon | .37 – .42 |
| Manganese | 1.40 – 1.60 |
| Phosphorus | .020 max. |
| Sulfur | .030 max. |
| Silicon | .20 – .28 |
| Molybdenum | .16 – .20 |
| Aluminum | .020 – .080 |

The remainder being iron with ordinary impurities.

Although the laminate monocoque construction of this invention provides the potential for increasing the strength of all sizes of tube structures, the construction is of particular utility and significance in the production of tube structures which are employed as mandrels whose outside diameters must be restricted to 4½ inches, or less.

Seamless-tube mills usually include a relatively long mandrel 12, e.g., in excess of 25 feet long, which supports and carries the piercer point 16, as shown in FIG. 1. A pair of opposing rolls 30 and 32 are positioned at specific angles (hereinafter described) to the mill center pass line CL. The rolls 30 and 32 are positioned so that each respective axis is oblique to pass line CL and thus the rolls impart two components of force to the metal of the billet round as it is forced through the mill. One component imparts a spinning or rotational motion while the other component imparts a longitudinal forward motion along the line CL. As the billet round is advanced, the resistance of the piercer point causes the metal to flow over and about the point and thus form the tube. It is to be noted that the piercer mandrel is not forced through the round but that the billet metal flows over and about the point and then around the mandrel. The tubes are made from billet rounds which generally range in length from about 86 to about 200 inches. As the length of the billets increase, the time of contact of the metal of a single billet with the piercer point is correspondingly increased as is the temperature of the piercer point. With repetitive piercing under such conditions, the piercer point loses its effectiveness and more compressive stress is imposed upon the support mandrel. Thus, a mandrel of increased strength capable to withstand the increased pressure forces would contribute substantially toward increasing the effective life of the piercer mandrel assembly 10.

As indicated above, the opposing rolls 30 and 32 are positioned with each respective axis being inclined with the pass line CL of the mill. The angle of inclination $\phi$ is generally in order of 6° to 12°. The larger angles, 9° to 12°, are employed in conjunction with the production of relatively large diameter tubes, i.e., those with outside diameters greater than 7 inches. In the production of intermediate size seamless tubes, i.e., those with outside diameters of 6 to 7 inches, it has been the practice to limit the angle of inclination of the roll to 8°. With such sizes, the practical limit of the piercer mandrel outside diameter is in the order of about 4½ inches because of the internal space available within the tube being formed. It was found, with the use of an ordinary mandrel with an outside diameter of about 4½ inches, that if the angle of inclination is exceeded beyond 8 degrees the mandrel fails comparatively early because of the additional imposed compressive stress. With an increase in angle the forward motion component force of the rolls is increased.

Through the use of the improved mandrel, this invention provides a method of increasing the production of a seamless tube mill. Because of the ability of the mandrel to withstand increased forces, the angle of inclination of the piercing rolls may be increased, e.g., in the production of intermediate size tubes, the angle $\phi$ may be increased to 9° to 11½°; as the angle of inclination is increased, the component of force contributing to the longitudinal forward motion of the billet round is increased and moves the metal faster over the piercer point. Thus it takes less time to move all of the metal of an individual billet over the point. The fact that the metal is in contact with the piercer point for a shorter time also contributes toward increased life of the piercer point.

We claim:

1. The method of producing a laminate seamless tube mill piercer mandrel assembly, comprising:
    stretch reducing in a rolling mill, while in combination and at hot working temperature in the absence of an internal mandrel, an outer tube and an inner tube in a manner whereby each of said tubes is elongated and the wall thickness is reduced, and said tubes are mutually engaged to form a bonded laminate mandrel;
    said tubes being of a composition, in percentage by weight, as follows:

| | |
|---|---|
| .37 – .42% | Carbon |
| 1.40 – 1.60 | Manganese |
| .020 max. | Phosphorus |
| .030 max. | Sulfur |
| .20 – .28 | Silicon |
| .16 – .20 | Molybdenum |
| .020 – .080 | Aluminum | the remainder being essentially iron;

adding a piercer point to said laminated mandrel to form a piercer mandrel assembly.

2. The method as described in claim 1, wherein:

the temperature of said outer tube, at the time of the hot work stretch reduction, is greater than the temperature of said inner tube.

3. The method of producing a laminate tube steel structure, comprising:

providing a combination of an outer steel tube over an inner steel tube;

heating said combination to hot working temperature; and stretch reducing, by the simultaneous application of compression and tension forces in a rolling mill and in the absence of an interior mandrel, the combination while at hot working temperature and thereby elongating and reducing the wall thickness of each of said tubes to bond the internal face of said outer tube and the external face of said inner tube.

4. The method, as described in claim 3, wherein:

at least one of said outer tube and said inner tube is of the seamless type.

5. The method as described in claim 3, wherein:

said outer tube, before said stretch reducing has a nominal outside diameter of 5½ inches and a nominal wall thickness of 0.340 inch;

said inner tube, before said stretch reducing, has a nominal outside diameter of 4½ inches and a nominal wall thickness of 0.310 inch; and the monocoque structure, produced by stretch reducing the combination has a nominal wall thickness of 0.600 inch.

* * * * *